US011262971B2

(12) United States Patent
Ellis

(10) Patent No.: US 11,262,971 B2
(45) Date of Patent: Mar. 1, 2022

(54) SCANNER WITH HOST PORTING AUDIO

(71) Applicant: NCR Corporation, Atlanta, GA (US)

(72) Inventor: Roland Ellis, Atlanta, GA (US)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 16/910,969

(22) Filed: Jun. 24, 2020

(65) Prior Publication Data

US 2021/0405956 A1    Dec. 30, 2021

(51) Int. Cl.
*G06F 3/16* (2006.01)
*H04R 3/00* (2006.01)

(52) U.S. Cl.
CPC ............ *G06F 3/162* (2013.01); *H04R 3/00* (2013.01); *H04R 2420/07* (2013.01); *H04R 2420/09* (2013.01)

(58) Field of Classification Search
CPC ....... G06F 3/162; H04R 3/00; H04R 2420/07; H04R 2420/09
USPC .......................................... 381/77, 333, 334
See application file for complete search history.

(56) References Cited

U.S. PATENT DOCUMENTS

| | | | | |
|---|---|---|---|---|
| 6,321,278 B1 * | 11/2001 | Phu | .................. | G06F 3/165 381/81 |
| 2001/0012126 A1 * | 8/2001 | Mori | .................. | H04N 1/00204 358/434 |
| 2003/0035555 A1 * | 2/2003 | King | .................. | H03G 5/005 381/103 |
| 2010/0260348 A1 * | 10/2010 | Bhow | .................. | H04N 21/4108 381/81 |
| 2012/0185245 A1 * | 7/2012 | Kikuchi | .................. | H03G 3/3005 704/225 |
| 2013/0062409 A1 * | 3/2013 | Nahill | .................. | G06K 7/1091 235/439 |
| 2013/0151737 A1 * | 6/2013 | Holan | .................. | G06F 11/3051 710/16 |
| 2018/0128888 A1 * | 5/2018 | Ropella | .................. | G01R 33/283 |
| 2018/0254957 A1 * | 9/2018 | Markham | .................. | H04L 41/22 |

* cited by examiner

*Primary Examiner* — Norman Yu
(74) *Attorney, Agent, or Firm* — Schwegman, Lundberg & Woessner

(57) ABSTRACT

A speaker integrated into a scanner is provided. The scanner comprises speaker firmware that presents the scanner as two separate logical devices to an Operating System (OS) of a connected host device. The integrated speaker of the scanner can be configured from the OS of the host device to be a primary or secondary speaker of the host device. The host device ports audio generated data on the host device over a wired or wireless connection to the speaker firmware, and the speaker firmware plays the host-generated audio data over or through the integrated speaker of the scanner.

4 Claims, 3 Drawing Sheets

SCANNER WITH HOST PORTING AUDIO

BACKGROUND

Transaction terminals assist in checking customers out during transactions. The transaction terminals include a variety of peripheral devices, such as touch displays, media dispensers, media acceptors, receipt printers, keypads, card readers, speakers, etc.

Typically, a transaction terminal's speaker is integrated into its display. As a result, audio problems often arise because of the speaker's location and orientation towards the operator or a customer at the terminal. The sound can be muffled, appear distant to the customer/operator, or even be inaudible. Some operators may attempt to change the orientation of the display, but this makes it more difficult to interact with the touch display based on the space where the terminal is located.

Consequently, operators/customers experience inferior sound that can impact any necessary transaction feedback or necessary transaction audible instructions during transactions. Moreover, for a visual impaired customer, the low-quality sound from the transaction terminal's speaker during a transaction may make it virtually impossible for the transaction to be completed without the assistance of someone who has no sight impairment.

SUMMARY

In various embodiments, a device, a system, and methods for providing audio from a host device through a scanner-integrated speaker.

According to an embodiment, a method for providing host device audio through an integrated speaker of a scanner is provided. For example, A scanner is presented as two separate and logically independent devices to a host device upon a connection between the scanner and the host device. The two separate and logically independent devices comprise a scanner device and a speaker. The scanner is configured for playing audio produced by the host device and the audio received from the connection is played over the speaker based on the configuration of the scanner.

DETAILED DESCRIPTION

Figure 1:
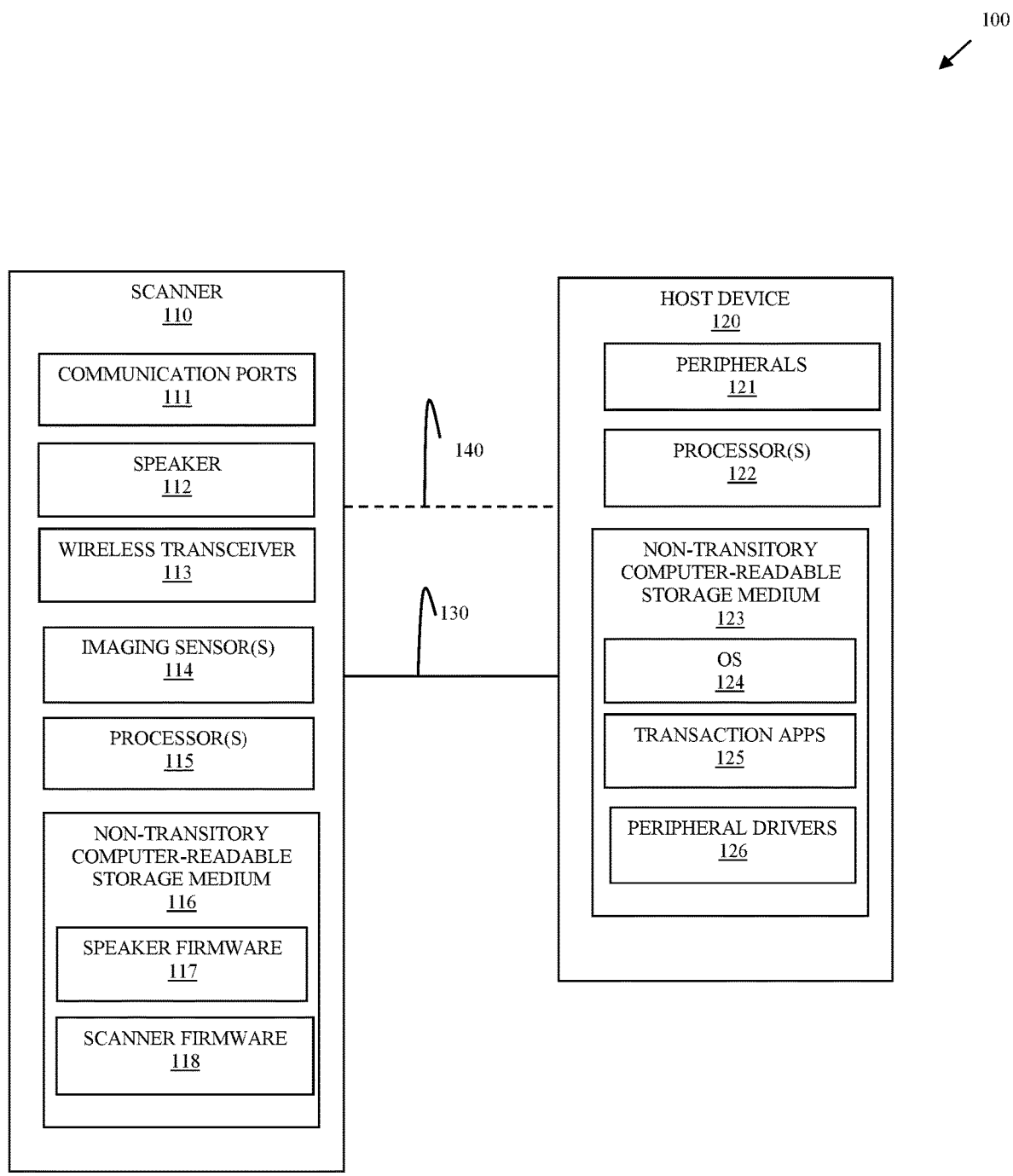
FIG. 1 is a diagram of a speaker and a system that provides host porting of audio through a scanner-integrated speaker, according to an example embodiment.

FIG. 1 is a diagram of a speaker 110 and a system 100 that provides host porting of audio through a scanner-integrated speaker, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of host porting of audio through a scanner-integrated speaker, presented herein and below.

The system 100 includes a scanner 110 and a host device 120.

The scanner 110 comprises one or more communication ports 111, a speaker 112, a wireless transceiver 113 (optional), one or more imaging sensors 114, one or more processors 115, and a non-transitory computer-readable storage medium 116 comprising speaker firmware instructions 117 and scanner firmware instructions 118.

The host device 120 comprises peripherals 121, one or more processors 122, and a non-transitory computer-readable storage medium 123 comprising executable instructions representing an Operating System 124, transaction applications (apps) 125, and peripheral drivers 126.

The host device 120 may connect to the scanner 110 through a variety of wired connections 130 and/or wireless connections 140.

During operation when the scanner 110 is first connected to host device 120 or when host device 120 is powered on or booted with an existing connection to scanner 110, the OS 124 is loaded from the non-transitory computer-readable storage medium 123 by processor 122, which causes processor 122 to recognize scanner 110 as two separate and independent devices, a scanner and an auxiliary speaker.

That is, speaker firmware 117 when executed by scanner processor 115 causes the scanner processor 115 to report two device identifiers and two device types to OS 124 over connection 130 or connection 140. OS 124 then loads the corresponding scanner identified type of peripheral driver 126 from medium 123 into memory of host device 110 and loads the corresponding speaker identified type of peripheral driver 126 into memory of host device 110.

A user-facing interface of OS 124 may (if this is the first time host device 110 is using speaker 112), present an interface window to the operator of host device 120 asking the operator if the operator wants to use speaker 112 as a primary speaker of host device 120; rather than the peripheral speaker of host device 120. When the user confirms the selection to use speaker 112 as a speaker for host device 120, the OS 124 activates and initiates the corresponding driver 126 for the speaker 112 on host device 120. This causes audio data produced during operation of host device 120 to be ported over connection 130 or connection 140 to speaker firmware 118, which then plays the audio data on speaker 112.

When processor 122 executes transaction apps 125 from medium 123, the audio data produced for transaction assistance, instruction, and alerts are provided over an audio data channel of connection 130 or connection 140 to speaker firmware 117 and played over/through speaker 112.

Scanner 110 includes integrated speaker 112 in a front-facing orientation, which is either facing up towards the operator or facing directly at the operator. This ensures that transaction audio is audible and of sufficient quality for transaction voice assistance, voice instruction, and any audible alert beeps/customized sounds.

Scanner firmware 118 also supports adjusting volume of speaker 112 and any other sound/audio settings through the corresponding scanner peripheral driver 126 and its user-facing interface from host device 120.

Scanner 110 presents to OS 124 of host device 120 as two independent, logical, and separate devices, the scanner 110 supported by scanner firmware 118 and speaker 112 supported by speaker firmware 117.

In an embodiment, scanner 110 is an existing scanner that is modified to include integrated speaker 112 (if one was not present) and enhanced speaker firmware 117.

In an embodiment, scanner 110 includes more than one speaker 112, such as two speakers 112; the speakers 112 supported by speaker firmware 117.

In an embodiment, scanner peripheral driver 126 and scanner firmware 118 combine to support using speaker 112 as a second speaker to a primary speaker of host device 120.

In an embodiment, speaker 112 is configured as the primary or as the only speaker used by host device 120.

In an embodiment, connection 130 is a Universal Serial Bus (USB) wired connection having data channels for transaction data being processed by scanner firmware 119 in connection with transaction apps 125 and USB connection 130 includes a separate audio channel associated with transaction audio data that is played over speaker 112. So, an existing single wired connection 130 between host device 120 and scanner 110 can used for both transaction data and transaction audio data. In this embodiment, scanner 110 includes a USB port 111 that is connected to a USB port of host device 110.

In an embodiment, connection 130 is an audio input port 111 that is separate from a USB data connection port 111 of scanner 110. Host device 120 includes an audio out port that is connected to the audio input port 111 of scanner 110.

In an embodiment, connection 130 is an HDMI (High-Definition Multimedia Connection) connection. In this embodiment, scanner 110 includes an HDMI communication port 111. The host device 120 includes an HDMI out port that is connected to the HDMI input port 111 of scanner 110.

In an embodiment, connection 130 is an ethernet connection. In this embodiment, scanner 110 includes an ethernet port 110. Host device 120 includes an ethernet port that is connected to the ethernet port 111 of scanner 110.

In an embodiment, connection 130 is supported by a digital audio port 111. In this embodiment, scanner 110 includes a digital audio input port 111 that is connected to a digital audio output port of host device 110.

In an embodiment, connection 140 is a WIFI connection, a Bluetooth® connection, or a Near Field Communication (NFC) connection. Wireless transceiver 113 supports wireless connection 140 between host device 120 and scanner 110.

In an embodiment, host device 120 is a Self-Service Terminal (SST), a Point-Of-Sale (POS) terminal, and Automated Teller Machine (ATM), a tablet computer, a phone, a laptop computer, or a desktop computer.

In an embodiment scanner 110 is a modified version of a series 78xx scanner having scanner firmware 117 distributed by NCR®, Inc.

System 100 permits host device 120 to use speaker 112 of scanner 110 as a primary and/or secondary speaker to host device 120 during transactions processed on host device 120. This is achieved through porting host-generated audio data over connection 130 or 140 to speaker firmware 117 for playing out of speaker 112.

Scanner 110 includes speaker firmware 117 and speaker 112. Speaker firmware 117 supports playing host-generated audio data over speaker 112 during transactions processed on host device 120.

These and other embodiments are now discussed with reference to FIGS. 2-3.

Figure 2:
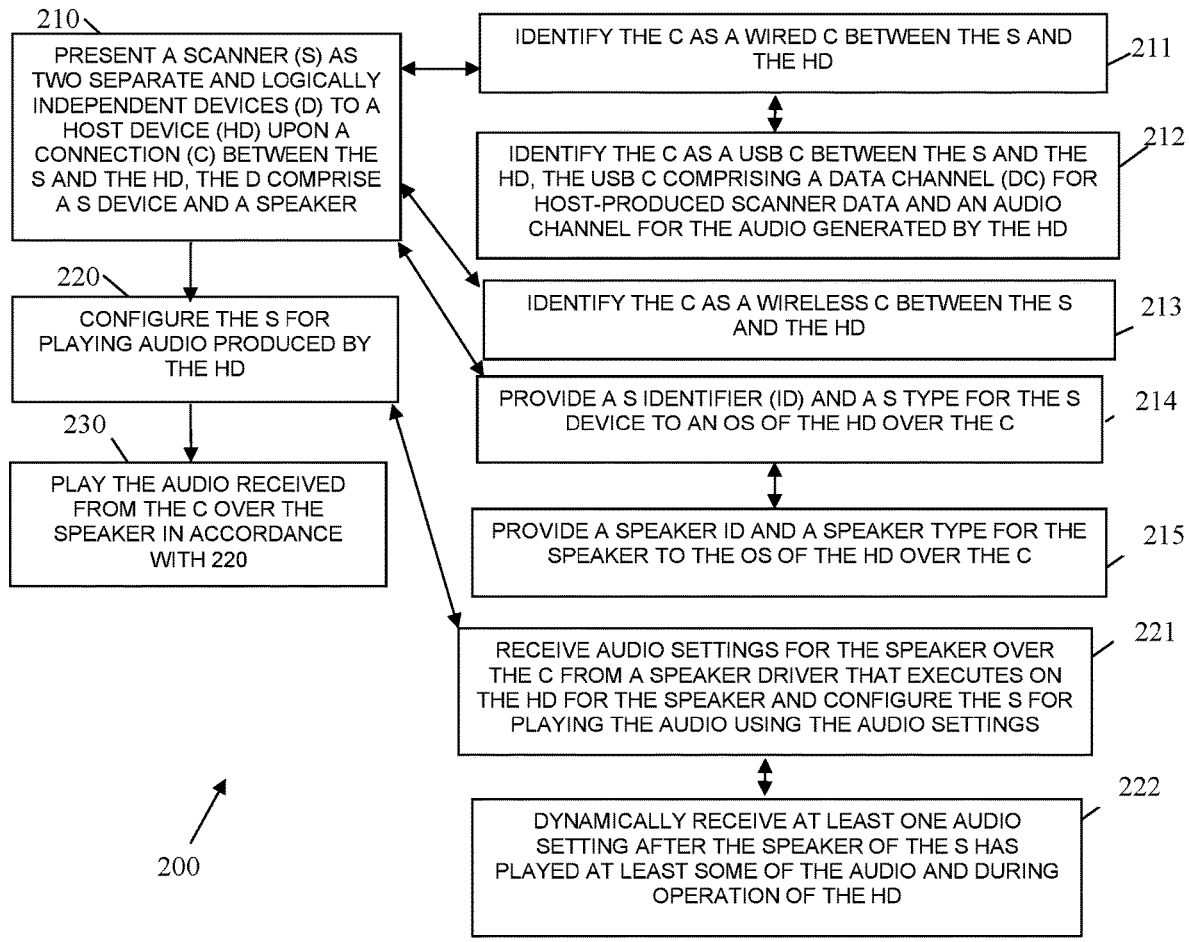
FIG. 2 is a diagram of a method for host porting of audio through a scanner-integrated speaker, according to an example embodiment.

FIG. 2 is a diagram of a method 200 for host porting of audio through a scanner-integrated speaker, according to an example embodiment. The software module(s)/firmware that implements the method 200 is referred to as a "scanner-based speaker controller." The scanner-based speaker controller is implemented as executable instructions programmed and residing within memory and/or a non-transitory computer-readable (processor-readable) storage medium and executed by one or more processors of a scanner. The processor(s) of the scanner that scanner-based speaker controller are specifically configured and programmed to process the scanner-based speaker controller. The scanner-based speaker controller has access to one or more network connections during its processing. The network connections can be wired, wireless, or a combination of wired and wireless.

In an embodiment, the scanner-based speaker controller executes on scanner 110.

In an embodiment, the scanner-based speaker controller is speaker firmware 117.

At 210, the scanner-based speaker controller presents a scanner as two separate and logically independent devices to a host device upon detection of a connection between the scanner and the host device. The two separate and logically independent devices comprise a scanner device having scanner functions and a speaker having audio functions.

In an embodiment, at 211, the scanner-based speaker controller identifies the connection as a wired connection between the scanner and the host device.

In an embodiment of 211 and at 212, the scanner-based speaker controller identifies the connection as a USB connection between the scanner and the host device. The USB connection comprising a data channel for host-produced scanner data and an audio channel for the audio generated by the host device. In this embodiment, there is one single wired USB connection between the scanner and the host device.

In an embodiment, at 213, the scanner-based speaker controller identifies the connection as a wireless connection between the scanner and the host device.

In an embodiment, at 214, the scanner-based speaker controller provides a scanner identifier and a scanner type for the scanner device to an OS of the host device over the connection.

In an embodiment of 214 and at 215, the scanner-based speaker controller provides a speaker identifier and a speaker type for the speaker to the OS of the host device over the connection.

At 220, the scanner-based speaker controller configures the scanner for playing audio produced by and received from the host device.

In an embodiment, at 221, the scanner-based speaker controller receives audio settings for the speaker over the connection from a speaker driver that executes on the host device for the speaker and the scanner-based speaker controller configures the speaker for playing audio using the audio settings.

In an embodiment of 221 and at 222, the scanner-based speaker controller dynamically receives at least one audio setting after the speaker has played at least some of the audio during operation of the host device. Here, an operator of the host device may select a speaker driver on the host device and dynamically switch a host speaker to port audio generated on the host device to the scanner-based speaker controller over the connection and use the speaker of the scanner.

At 230, the scanner-based speaker controller plays the audio received from the connection over the speaker in accordance with audio settings provided at 220.

Figure 3:
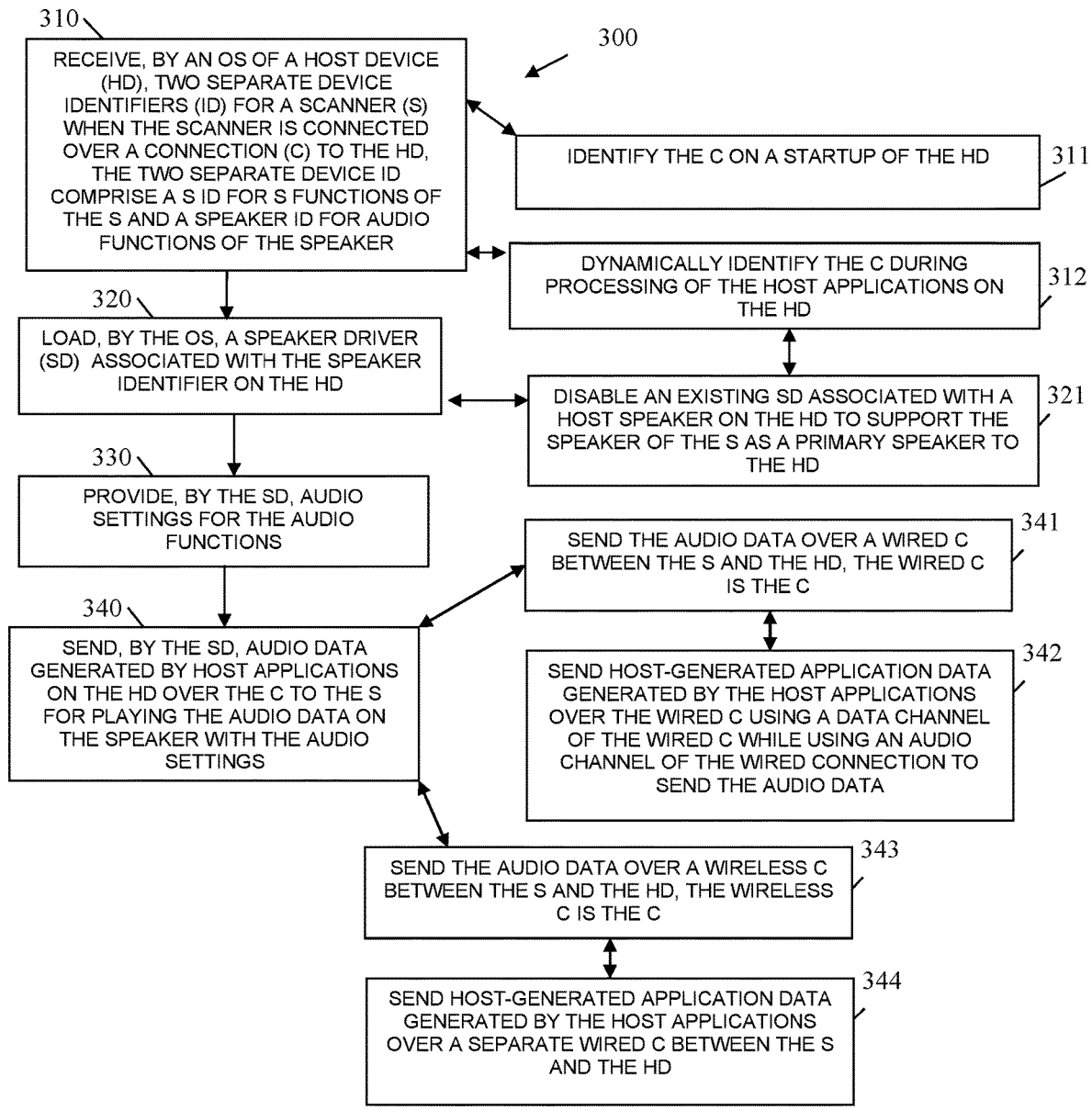
FIG. 3 is a diagram of another method for host porting of audio through a scanner-integrated speaker, according to an example embodiment.

FIG. 3 is a diagram of another method 300 for host porting of audio through a scanner-integrated speaker, according to an example embodiment. The software module(s) that implements the method 300 is referred to as a "host-device speaker driver." The host-device speaker driver is implemented as executable instructions programmed and residing within memory and/or a non-transitory computer-readable (processor-readable) storage medium and executed by one or more processors of a host device. The processors that execute the host-device speaker driver are specifically configured and programmed to process the host-device speaker driver. The host-device speaker driver has access to one or more network connections during its processing. The network connections can be wired, wireless, or a combination of wired and wireless.

In an embodiment, the host-device speaker driver executes on host device 120. In an embodiment, host device 120 is an SST, an POS terminal, an ATM, a phone, a tablet, a laptop, or a desktop computer.

In an embodiment, the host-device speaker driver is speaker peripheral driver 126 and OS 124.

The host-device speaker driver interacts with method 200 to port audio data generated by host device 120 to speaker firmware 117 for playing the audio data on integrated speaker 112 of speaker 110 during transactions being processed on host device 120.

At 310, an OS of the host device receives two separate device identifiers from a scanner when the scanner is connected over a connection to the host device. The two separate device identifiers comprise a scanner identifier for scanner functions of the scanner and a speaker identifier for audio functions of the speaker that is integrated into the scanner.

In an embodiment, at 311, the OS identifies the connection on a startup or power on of the host device.

In an embodiment, at 312, the OS dynamically identifies the connection during processing or operation of host application on the host device.

At 320, the OS loads a speaker driver associated with the speaker identifier on the host device.

In an embodiment of 312 and 320, at 321, the host-device speaker driver disables an existing speaker driver associated with a host speaker on the host device to support the speaker of the scanner as a primary speaker to the host device.

At 330, the speaker driver provides audio settings for the audio functions of the scanner speaker over the connection to the scanner.

At 340, the speaker driver sends audio data generated by host applications on the host device over the connection to the scanner for playing the audio data on or through the speaker with the audio settings provided at 330.

In an embodiment, at 341, the speaker driver sends the audio data over a wired connection between the scanner and the host device. Here, the wired connection is the connection detected at 310.

In an embodiment of 341 and at 342, the speaker driver sends host-generated application data generated by the host applications over the wired connection using a data channel of the wired connection while simultaneously using an audio channel of the same wired connection to send the audio data to the scanner.

In an embodiment, at 343, the speaker driver sends the audio data over a wireless connection between the scanner and the host device. Here, the wireless connection is the connection detected at 310.

In an embodiment of 343 and at 344, the speaker driver sends host-generated application data generated by the host applications over a separate wired connection between the scanner and the host device.

It should be appreciated that where software/firmware is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules/firmware are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A scanner, comprising:
    one or more imaging sensors;
    at least one integrated speaker;
    at least one processor;
    a non-transitory computer-readable storage medium comprising executable instructions representing scanner firmware and speaker firmware;
    the scanner firmware when executed by the at least one processor from the non-transitory computer-readable storage medium causes the at least one processor to perform processing comprising:
        presenting a scanner device identifier to an Operating System (OS) of a transaction terminal upon a connection between the scanner and the transaction terminal, wherein the transaction terminal processes transactions at the transaction terminal using the scanner;
        generating scanner data detected by the one or more imaging sensors;
        providing the scanner data over the connection to a scanner driver of the transaction terminal for the transactions;
        receiving scanner instructions from the scanner driver of the transaction terminal over the connection; and
        processing the scanner instructions;
    the speaker firmware when executed by the at least one processor from the non-transitory computer-readable storage medium causes the at least one processor to perform additional processing comprising:

presenting a speaker identifier to the OS of the transaction terminal upon the connection between the scanner and the transaction terminal;

receiving speaker settings from a speaker driver of the transaction terminal over the connection;

configuring the speaker to play audio using the speaker settings for transaction assistance during the transactions at the transaction terminal; and playing transaction application-generated audio data generated by transaction applications of the transaction terminal and provided by the speaker driver over the connection on the speaker with the speaker settings.

2. The scanner of claim 1, wherein the transaction terminal is: a Self-Service Terminal (SST), a Point-Of-Sale (POS) terminal, an Automated Teller Machine (ATM), a kiosk, a mobile phone, a tablet computer, a laptop computer, or a desktop computer.

3. The scanner of claim 1, wherein the connection is a wired connection between the scanner and the transaction terminal.

4. The scanner of claim 1, wherein the connection is a wireless connection between the scanner and the transaction terminal.

* * * * *